United States Patent
Curelar

(10) Patent No.: US 11,181,810 B1
(45) Date of Patent: Nov. 23, 2021

(54) MODULAR CAMERA HOUSING KIT

(71) Applicant: GoTek, LLC, Hueytown, AL (US)

(72) Inventor: Jonathan Curelar, Hueytown, AL (US)

(73) Assignee: GoTek, LLC, Hueytown, AL (US)

( * ) Notice: Subject to any disclaimer, the term of this patent is extended or adjusted under 35 U.S.C. 154(b) by 0 days.

(21) Appl. No.: 17/104,945

(22) Filed: Nov. 25, 2020

(51) Int. Cl.
*G03B 17/02* (2021.01)
(52) U.S. Cl.
CPC .................................. *G03B 17/02* (2013.01)
(58) Field of Classification Search
CPC .... G03B 17/02; H04N 5/2251; H04N 5/2252; H04N 5/2257
USPC .................................................. 396/535, 541
See application file for complete search history.

(56) References Cited

U.S. PATENT DOCUMENTS

| | | | |
|---|---|---|---|
| 2011/0075276 A1* | 3/2011 | Lin ........................ | G02B 7/025 359/819 |
| 2015/0070573 A1* | 3/2015 | Koppetz .............. | H04N 5/2252 348/373 |
| 2015/0219982 A1* | 8/2015 | Aiello .................. | H01R 13/639 361/601 |
| 2018/0007245 A1* | 1/2018 | Rantala ................ | H04N 5/2253 |

\* cited by examiner

*Primary Examiner* — Christopher E Mahoney
(74) *Attorney, Agent, or Firm* — Jake M. Gipson; Bradley Arant Boult Cummings LLP

(57) ABSTRACT

A kit for constructing a camera housing comprises a main housing unit, a first end cover, and a base stand. The main housing unit contains a camera compartment, and each end of the main housing unit is at least partially open to a recessed slot that has a width at an outer portion of the slot that is less than the width of an interior portion of the slot. The first end cover includes a locking piece having a shape that is complementary to the shape of one of the recessed slots. The base stand comprises a base having a top surface and a protrusion extending from the top surface, wherein the protrusion has a shape that is complementary to the shape of one of the recessed slots. Preferably, the shape of the vertical cross section of the two recessed slots is approximately the same.

22 Claims, 18 Drawing Sheets

MODULAR CAMERA HOUSING KIT

FIELD OF THE DISCLOSURE

The present disclosure relates to security cameras, and more particularly to housing units for security cameras.

BACKGROUND OF THE INVENTION

Numerous businesses and facilities use security cameras for various purposes. For instance, banks typically install a security camera at each teller's station. As another example, facilities that have a secure area often install a security camera that monitors access to that secure area or that monitors the users who access the features that control access (e.g. keypad) to that area.

Because there are many ways to install a security camera, the most appropriate installation varies based on the environment and the intended objective of the security camera. As a result, even with the same facility, there may be a desire for multiple different camera installations. For instance, it may be desirable to install some cameras on a desk or shelf at the level of the desk or shelf, to install some cameras on other desks or shelfs at an elevated height from that desk or shelf, to install some cameras on the wall or from the ceiling, or to install other cameras on a stand on the floor. As part of any of these installations, it is often desired to hide the cords associated with the camera too.

In addition, there is often a need or desire to install these security cameras discretely. Customers may feel more comfortable if they do not have the impression that they are being constantly monitored. Additionally, if criminals or other unauthorized persons do not realize that the cameras are present, they cannot attempt to conceal their presence or identity from the cameras.

Many manufacturers sell various mounts and housing units for security cameras. These mounts and housing are typically specific to a particular type of installation. For example, a particular mount may be a stand mount, or it may be a wall mount. If a customer purchases one of these mounts and it turns out to be unsuitable (e.g. the installation plans change or the stand is the wrong height), a different mount or housing must be purchased.

Consequently, there is a need in the art for a modular camera housing kit that can accommodate numerous types of installations and configurations. Preferably, the housing kit would include an assortment of parts that allow for installing the housing at numerous heights and on numerous surfaces. Even more preferably, the housing kit would allow for easy configuration of the components, with few or no tools required. The housing kit preferably would also include features to discretely route the cords associated with a security camera and may be designed to conceal the presence of the camera and blend into its installation environment.

SUMMARY OF THE INVENTION

The present disclosure describes a modular housing kit for use with security cameras. Advantageously, embodiments of the modular housing kit may be configured and installed in multiple different configurations. Because embodiments of the modular housing kit include multiple interchangeable parts, a security camera housing can be readily tailored to different installation needs, which may vary based installation surfaces and location. The components of the modular housing kit preferably include features, such as complementary recessed slots and protrusions, that allow for an easy yet strong connection between the components that can be assembled with few or no tools. In preferred embodiments, the various components of the kit also include features to conceal and route the cords associated with a security camera, which allows a security camera to be discretely installed. Embodiments of the invention may thus satisfy one or more, but not necessarily all, of the needs and capabilities described throughout this disclosure.

In some embodiments, a kit for constructing a camera housing comprises (1) a main housing unit having a first end, a second end, and a front face, wherein the main housing unit contains a camera compartment having an opening to the front face, and wherein the main housing unit at each end is at least partially open to a recessed slot that has a width at an outer portion of the slot that is less than the width of an interior portion of the slot; (2) a first end cover comprising a locking piece having a shape that is complementary to the shape of the recessed slot at the first end; and (3) a base stand comprising a base having a top surface and a protrusion extending from the top surface, wherein the protrusion has a shape that is complementary to the shape of the recessed slot at the second end. Preferably, the shape of the vertical cross section of the recessed slot at the first end is approximately the same as the shape of the vertical cross section of the recessed slot at the second end.

In another embodiment, a kit for constructing a camera housing comprises (1) a main housing unit having a first end, a second end, and a front face, wherein the main housing unit contains a camera compartment having an opening to the front face, wherein the main housing unit at each end is at least partially open to a recessed slot that has a width at an outer portion of the slot that is less than the width of an interior portion of the slot, and wherein the shape of the vertical cross section of the recessed slot at the first end is substantially the same as the shape of the vertical cross section of the recessed slot at the second end; (2) a first end cover comprising a locking piece having a vertical cross sectional shape that is complementary to the shape of the vertical cross section of the recessed slots; (3) a second end cover comprising a locking piece having a vertical cross sectional shape that is complementary to the shape of the vertical cross section of the recessed slots; (4) a first housing extension having a male end and a female end, wherein at the female end the first housing extension is at least partially open to a recessed slot that has a width at an outer portion of the slot that is less than the width of an interior portion of the slot and that has a vertical cross section with a shape that is substantially the same as the shape of the vertical cross section of the recessed slots of the main housing unit, and wherein at the male end the first housing extension comprises a protrusion that has a vertical cross sectional shape that is complementary to the shape of the vertical cross section of the recessed slots; and (5) a base stand comprising a base having a top surface and a protrusion extending from the top surface, wherein the protrusion has a vertical cross sectional shape that is complementary to the shape of the vertical cross section of the recessed slots.

In yet another embodiment, a modular housing unit for a camera comprises (1) a main housing comprising: a front face; an internal camera compartment having an opening to the front face; and a first end opposite of a second end, wherein the main housing at each end is at least partially open to a recessed slot that has a width at its exterior opening that is less than the width of an interior portion of the slot, and wherein the shape of the vertical cross section of the recessed slot at the first end is approximately the same as the shape of the vertical cross section of the recessed slot at the second end; and (2) a removable back plate that at least partially covers the recessed slot of the first end and at least partially covers the recessed slot of the second end.

The above summary presents a simplified summary to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DEFINITIONS

Figure 1:
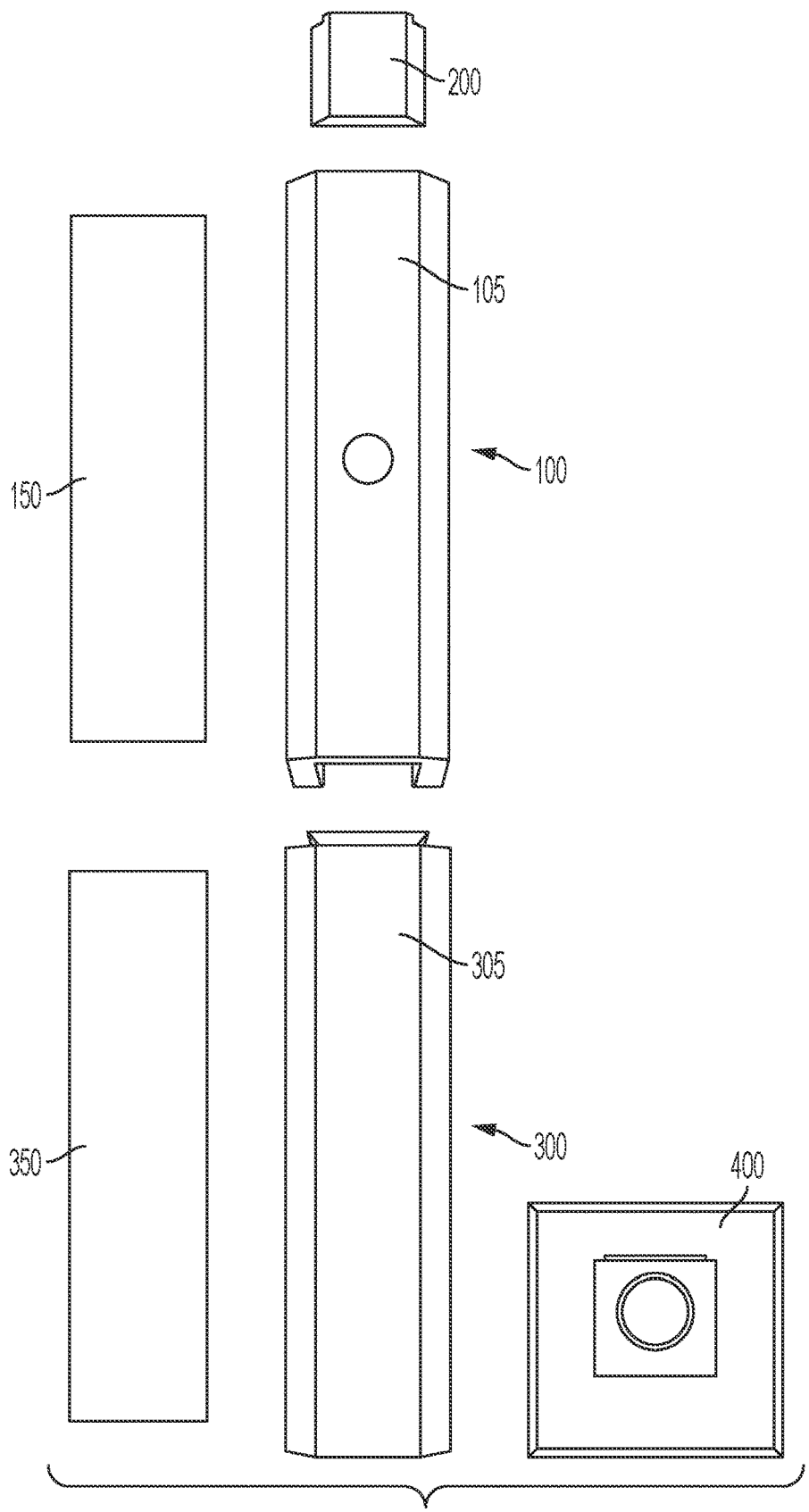
FIG. 1: A disassembled view of one embodiment of a modular housing kit.
Figure 2:
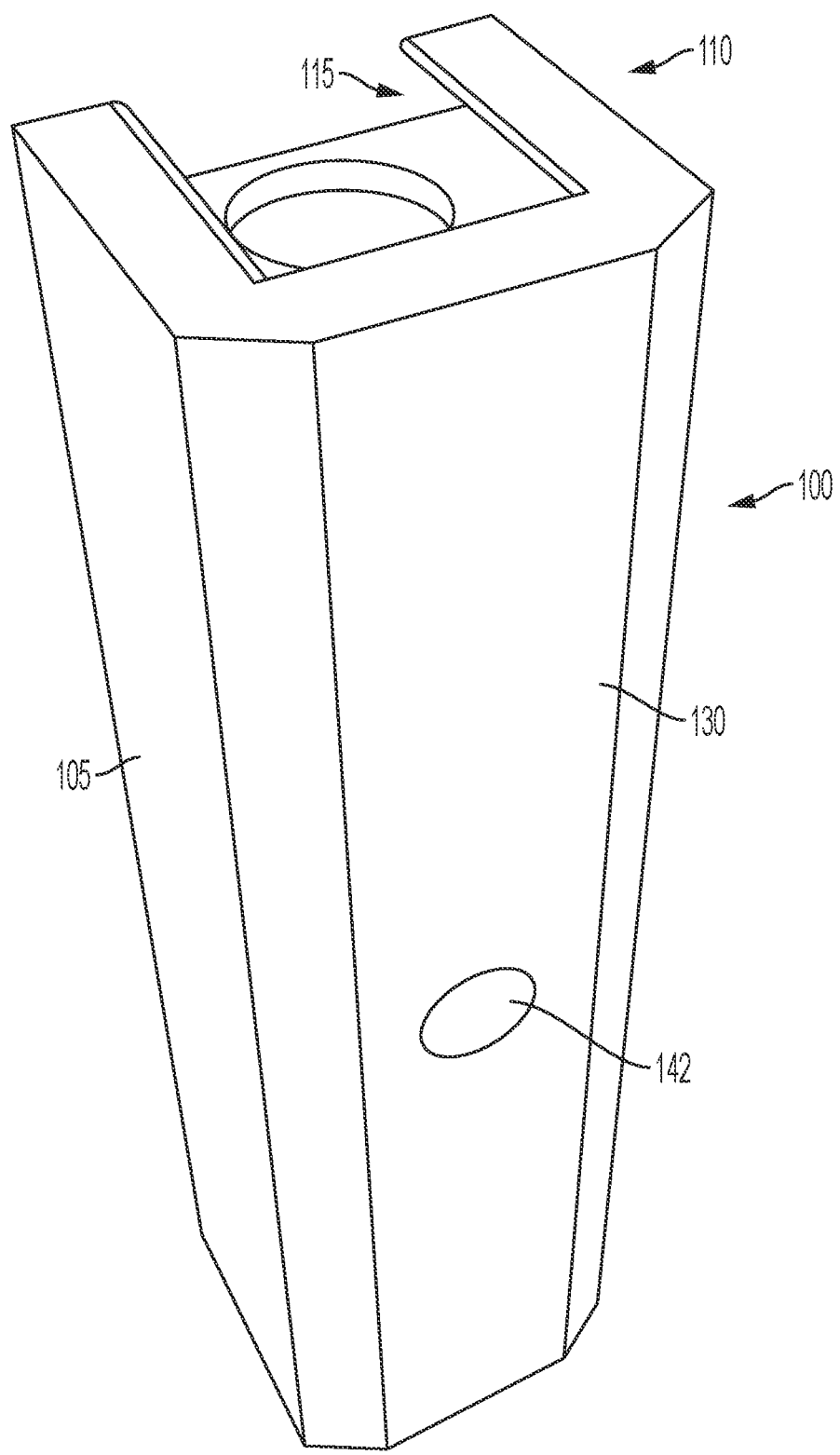
FIG. 2: A front perspective view of one embodiment of a main housing unit of a modular housing kit.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an," and "the" are intended to include the plural forms as well, unless the context clearly indicates otherwise.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure. Likewise, terms such as "top" and "bottom" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described are further intended to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

A modular housing kit has been developed and is described in this disclosure. The modular housing kit is particularly advantageous for providing flexibility to install security cameras in a variety of configurations. But the teachings are not limited to such applications, and the modular housing kit may be used with any device, such as another type of sensor, where it is desirable to install that device in numerous different configurations.

An exemplary embodiment of the modular housing kit and its various components is shown in FIGS. 1-13. In this embodiment, the modular housing kit comprises a main housing unit 100, a first end cover 200, a first housing extension 300, and a base stand 400. The main housing unit 100 preferably has a removable backplate 150 and two female ends 110, 120 having recessed slots 115. The first housing extension 300 preferably has a removable backplate 350, a female end 310 having a recessed slot 315, and a male end 320 having a protrusion 325. The base stand 400 also has a protrusion 425. Each female end 110 of the main housing unit 100 is receptive of the first end cover 200, the male end 320 of the first housing extension 300, or the protrusion 425 of the base stand 400. The female end 310 of the first housing extension 300 is also receptive of the first end cover 200 or the protrusion 425 of the base stand 400. Accordingly, the components of the modular housing kit, and additional components not shown in FIG. 1, may be assembled in various arrangements, some of which are depicted in FIGS. 14-17. Numerous variations of the components and arrangements are possible. Each of these components and their variations are further described below.

The components of the modular housing kit may be constructed from any suitable material. In a preferred embodiment, one or more components are constructed from a polymer. Other components may be constructed from a metal or metal alloy.

The modular housing kit includes at least one main housing unit 100. In a preferred embodiment, the main housing unit 100 comprises a main body 105 having a front face 130, an internal camera compartment 140, and a first end 110 opposite of a second end 120; and a removable backplate 150. In some embodiments, the shape of the main housing unit 100 is generally a rectangular prism and the front face 130 is a flat surface. In a specific preferred embodiment, the main housing unit 100 is substantially a rectangular prism with its front corners rounded or chamfered, the main housing unit 100 having a length of about 8 inches, a width of about 2.25 inches, and a depth of about 2 inches. But the main housing unit 100 may be any suitable shape, such as generally cylindrical, and the front face 130 may be curved or rounded.

The main body 105 includes an internal camera compartment 140 that has an opening 142 through the front face 130. The internal camera compartment 140 is dimensioned to accommodate a suitable security camera. In an exemplary embodiment, the internal camera compartment accommodates a 2 MP Mini Network Camera, offered by ENS (Model No. SIPSH2/B28-M). In some embodiments, the internal dimensions of the camera compartment 140 may be matched to the external dimensions of the security camera. In other embodiments, the internal camera compartment 140 may include various structures, such as slots protrusions, or brackets, to secure the security camera within the compartment 140. The opening 142 may be dimensioned to accommodate a lens protruding from a security camera, or alternatively, the opening 142 may located so that the lens of a security camera installed in the compartment 140 looks through the opening 142.

Figure 3:
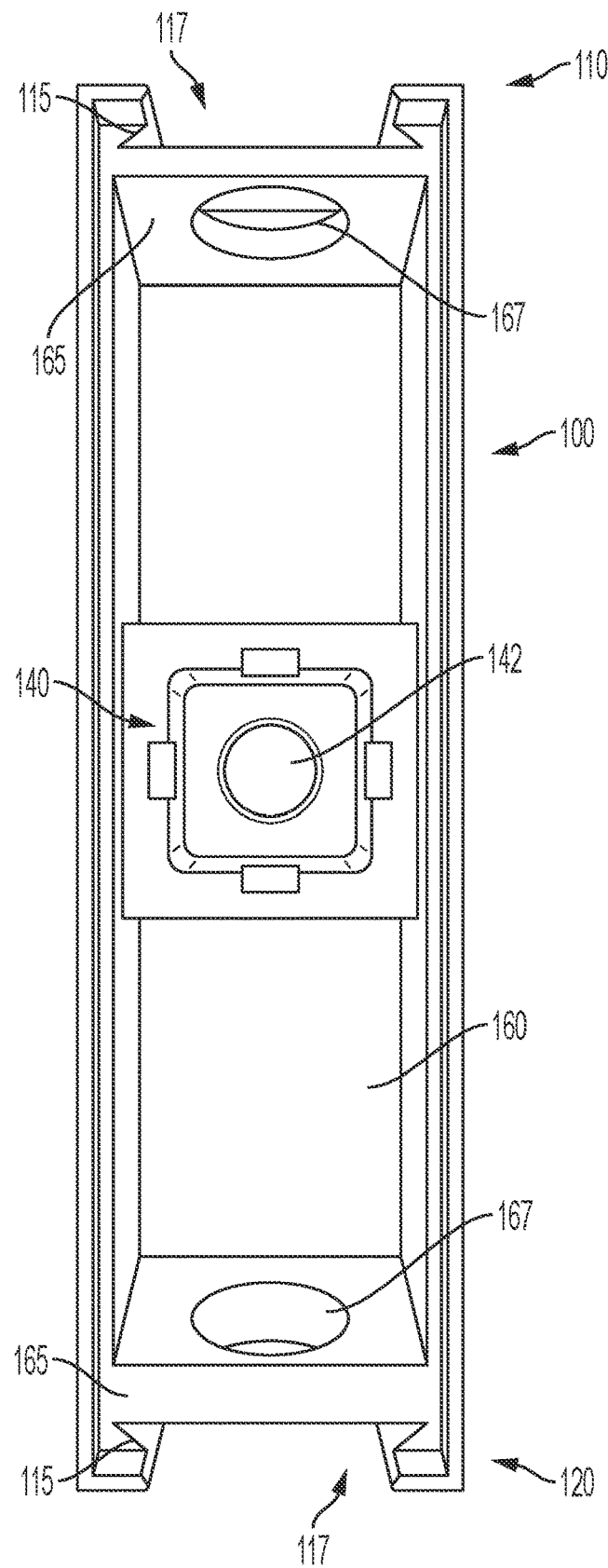
FIG. 3: A rear view of one embodiment of a main housing unit of a modular housing kit.

The internal camera compartment 140 is preferably accessible via a removable backplate 150. The removable backplate 150 may be secured using any suitable fastener, such as screws. Alternatively, the backplate 150 and main body 105 may include structures (such as small protrusions and corresponding recesses) to snap the backplate 150 into place. In some embodiments, a through hole may extend through the backplate to allow camera cords to pass behind the main housing unit 100. Once removed, the removable backplate 150 preferably exposes the entire interior of the main housing unit 100, although in some embodiments, the internal camera compartment 140 may have its own removable backplate. In a preferred embodiment, the interior of the main housing unit 100 is substantially hollow, which allows the main housing unit 100 to house and conceal the cords associated with a security camera. As shown in FIG. 3, the substantially hollow interior 160 may include one or more cross supports 165 to provide structural support to the ends and walls of the main housing unit 100. If the cross supports 165 extend across the hollow interior, the cross supports 165 preferably include through holes 167 to allow the cords to pass through the cross supports 165 to either end 110, 120 of the main housing unit 100. Alternatively, in other embodiments, the interior of the main housing unit 100 may be substantially solid but, preferably, include one or more channels for running the cords of the security camera. Preferably, the two ends 110, 120 of the main housing unit 100 are mirror images of each other. This configuration allows the other components of the modular housing kit to secure to either end 110, 120 of the main housing unit 100, which increases the flexibility of a single modular housing kit to accommodate many different arrangements. In some embodiments, however, the two ends 110, 120 may be different. For instance, the main housing unit 100 may have a female end and a male end.

In a preferred embodiment, each end 110, 120 is a female end. In this embodiment, the main housing unit 100 at each end 110, 120 is at least partially opened to a recessed slot 115. Preferably, the recessed slot 115 extends from the rear of the main housing unit toward the front face 130, but the recessed slot does not extend into the front face 130. The, the depth of the recessed slot 115 is less than the depth of the main housing unit 100. In specific preferred embodiment, the depth of the recessed slot is about 1.5 inches. The recessed slot 115 is thus open at both its exterior opening 117 at the end (either 110, 120) and its rear opening (116) in the rear of the main body 105 of the main housing unit. But preferably, when the removable backplate 150 is installed, the backplate 150 at least partially covers the rear opening 116 of the recessed slot 115. As explained below, the backplate 150 helps to secure the protrusion of another component in the slot 115.

Figure 4:
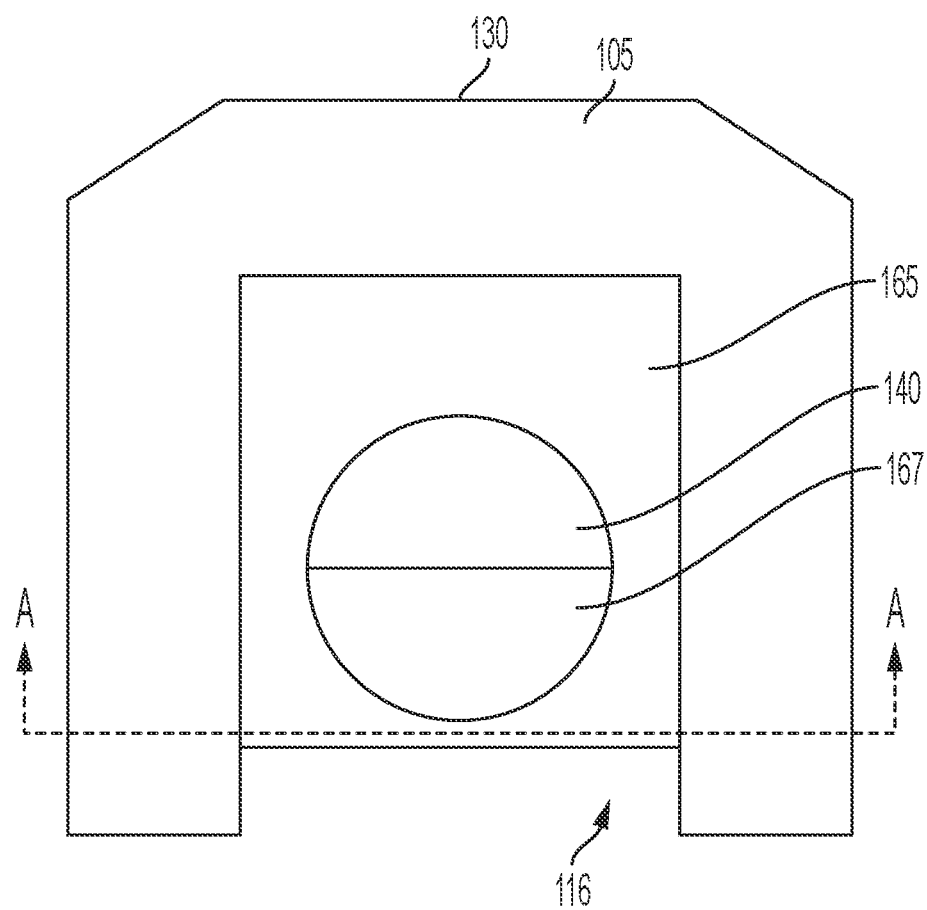
FIG. 4: An end view of one embodiment of a main housing unit of a modular housing kit. The other end is a mirror image.
Figure 5:
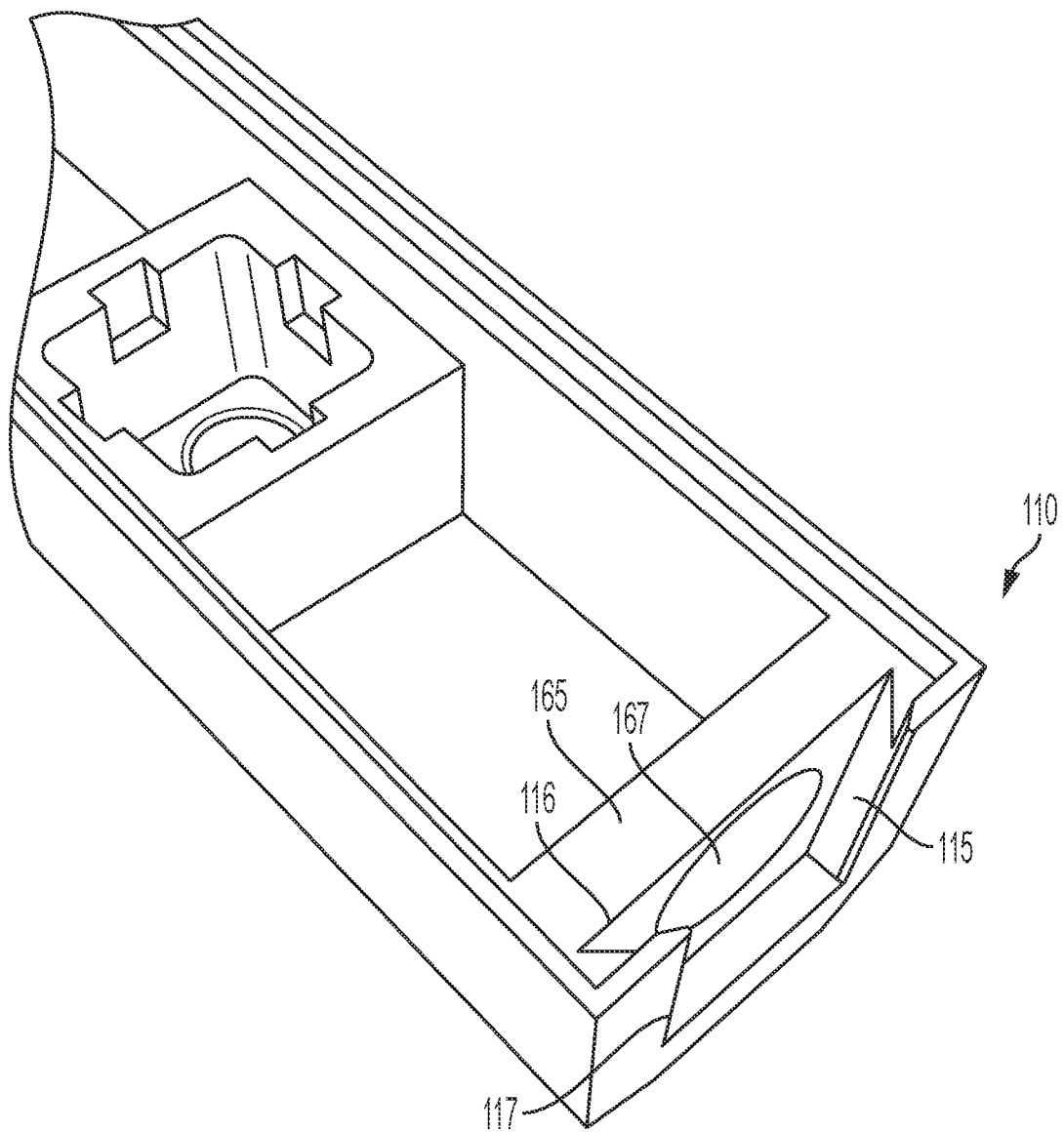
FIG. 5: A detailed perspective view of one end of an embodiment of a main housing unit of a modular housing kit.

The shape of the recessed slot 115 is generally defined with reference to a vertical cross section of the slot, taken as A-A as shown in FIG. 4. The recessed slot 115 may have a vertical cross section of any suitable shape. Preferably, an outer portion of the cross section (or a portion of the cross section closer to the end 110, 120) has a width that is less than the width of an inner portion of the cross section. Even more preferably, the width of the cross section in some embodiments may continually decrease from the outermost edge to the innermost edge of the recessed slot. But in other embodiments, portions of the cross section may have a constant width, or some inner portions of the cross section may decrease in width rather than increase. FIGS. 18A-E depict various shapes that may be suitable cross sections. In a specific preferred embodiment, the vertical cross section of the recessed slot is a trapezoidal shape with an outermost edge with a length of about 1.25 inches, an innermost edge with a length of about 1.75 inches, and a height of about 0.25 inches.

Alternatively, in some embodiments, one or both of the ends 110, 120 may be a male end. The male end may comprise any suitable structure, such as any of the variations discussed below with respect to the housing extensions 300. In an exemplary embodiment, the male end of the main housing unit 100 comprises a protrusion extending from the end of the main housing unit 100. Preferably, the protrusion has a vertical cross sectional shape in which an outer portion of the cross section (or a portion of the cross section that is farther from the main housing unit 100) has a width that is greater than the width of an inner portion of the cross section. Any of the exemplary shapes that may be suitable for the shape of the vertical cross section of a recessed slot 115, see FIGS. 18A-E, may also be suitable for the complementary shape of the vertical cross section of the protrusion.

Figure 6:
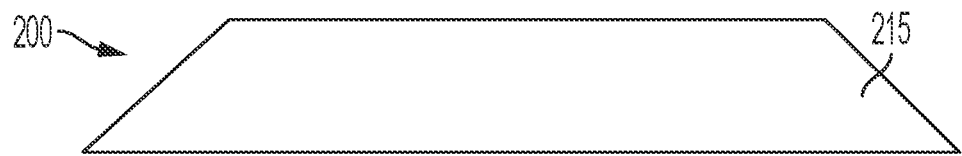
FIG. 6: A front view of one embodiment of an end cover of a modular housing kit.
Figure 7:
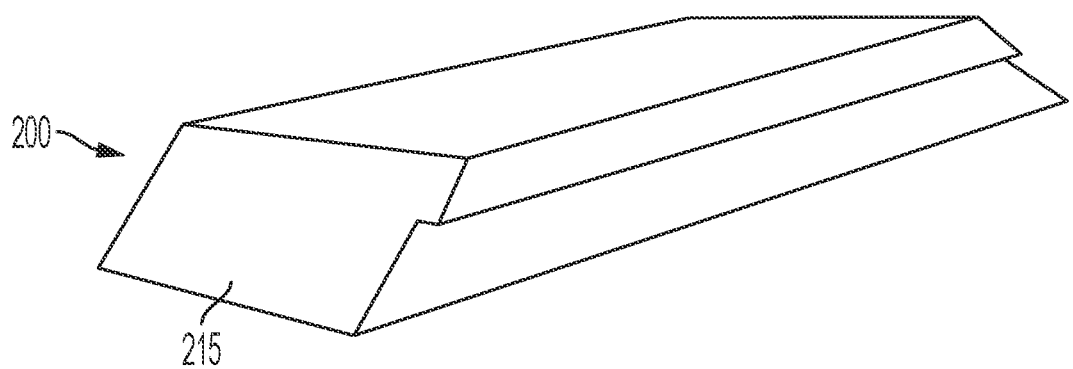
FIG. 7: A rear perspective view of one embodiment of an end cover of a modular housing kit.
Figure 8:
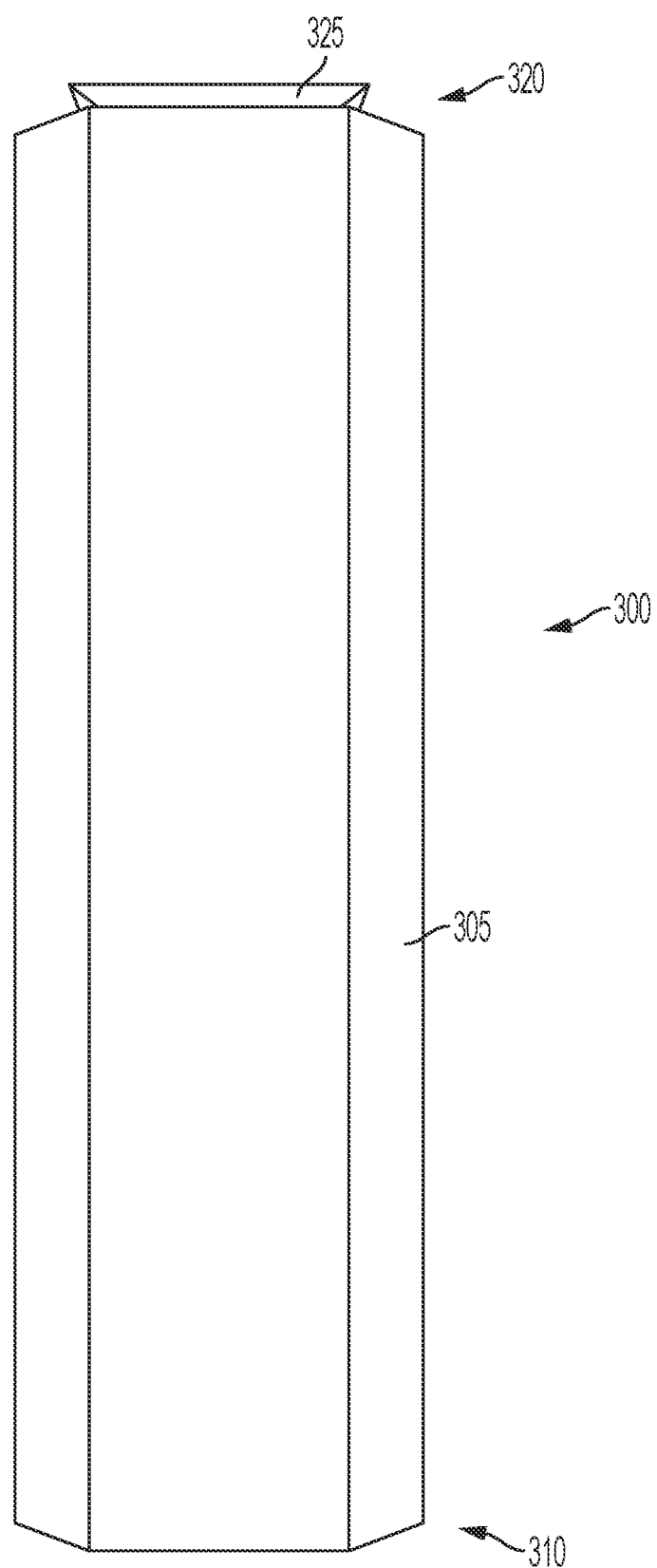
FIG. 8: A front view of one embodiment of a housing extension of a modular housing kit.

Each modular housing kit preferably includes one, and even more preferably two, end covers 200. In embodiments where one or both of the ends 110, 120 of the main housing unit 100 are female ends, an end cover 200 preferably comprises a locking piece 215 that has a shape that is complimentary to the shape of the recessed slot 115 of the female ends. Therefore, the locking piece 215 preferably has a vertical cross section having a shape that is substantially the same as the shape of the vertical cross section of the recessed slot 115 and a length that is less than the depth of the recessed slot 115. The locking piece 215 therefore can be completely inserted into the recessed slot 115. In a specific preferred embodiment, the locking piece 215 has a length of about 1.5 inches and a vertical cross section having a trapezoidal shape with an uppermost edge having a length of about 1.25 inches, an lowermost edge having a length of about 1.75 inches, and a height of about 0.25 inches. Preferably, the removable backplate 150 secures the locking piece 215 in the recessed slot 115, such that the locking piece 215 cannot be withdrawn from the slot 115 without first removing the removable backplate 150. Alternatively, the recessed slot 115 and/or the locking piece 215 may include a structure to snap the locking piece into place. In some embodiments, such as shown in FIGS. 6-7, the end cover 200 consists only of a locking piece. In other embodiments, however, the end cover 200 may comprise a locking piece protruding from an end cap.

In embodiments where one or both of the ends 110, 120 of the main housing unit 100 are male ends, an end cover preferably comprises an end cap having a recessed slot. The recessed slot of the end cap preferably has a shape that is complimentary to the shape of the protrusion of a male end. Thus, a protrusion of the main housing unit 100 can be inserted into the end cap. Optionally, a backplate may secure the end cap around the protrusion, or the recessed slot and/or protrusion may include a structure that allows the end cap to snap onto the protrusion.

The modular housing kit also includes a base stand 400 comprising a base 410 having a top surface 415. The base 410 may have any suitable shape and is generally substantially wider than the main housing unit 100 so as to provide stability. In a specific preferred embodiment, the base 410 has a length and width of about 3.5 inches and a thickness of about 0.375 inches.

In embodiments where the main housing unit 100 has one or both female ends, the base stand 400 may further comprise a protrusion 425 extending from the top surface 415. Preferably, the protrusion 425 is located at or near the center of the base stand 400, which improves stability. The protrusion 425 may be complimentary to the recessed slot 115 of the female ends of the main housing unit 100. Preferably, the protrusion has a vertical cross sectional shape in which an upper portion of the cross section (or a portion of the cross section that is farther from the base 410) has a width that is greater than the width of a lower portion of the cross section. Any of the exemplary shapes that may be suitable for the shape of the vertical cross section of a recessed slot 115, see FIGS. 18A-E, may also be suitable for the complementary shape of the vertical cross section of the protrusion. In a specific preferred embodiment, the protrusion has a depth of about 1.5 inches and a vertical cross section of a trapezoidal shape having an uppermost edge that is about 1.75 inches long, a lowermost edge that is about 1.25 inches long, and a height of about 0.25 inches.

In a preferred embodiment, a through hole 427 extends through the protrusion 425 and base 410. The through hole allows cords from the interior of a connected main housing unit 100 or housing extension 300 to pass through and underneath the base stand 400.

Alternatively, in embodiments where the main housing unit 100 has one or both male ends, the base stand 400 may further comprise a recessed slot. The recessed slot of the base stand 400 is preferably complimentary to the protrusion of a male end. Thus, a protrusion of the main housing unit 100 can be inserted into the base stand 400. Preferably, the recessed slot extends into the base stand so that the protrusion of the main housing unit 100 or another component can be slid to approximately the center of the base stand 400, which improves stability. As a result, when the protrusion is fully inserted, a portion of the recessed slot may remain visible. The base stand 400 may therefore further comprise a plug, which can be inserted into the recessed slot to conceal the opening and help to secure the main housing unit 100 to the base stand 400. In a preferred embodiment, a through hole extends through the base of the recessed slot and aligns with a through hole of the protrusion to allow cords from the interior of a connected main housing unit 100 or housing extension 300 to pass through and underneath the base stand 400.

Many preferred embodiments of the modular housing kit also include at least one housing extension 300. In an exemplary embodiment, the housing extension 300 comprises an extension body 305 having a first end 310 opposite of a second end 320; and a removable backplate 350. The shape of the housing extension 300 is preferably the same as the shape of the main housing unit 100, although the exact dimensions (particularly, the overall length) may vary. For instance, if the shape of the main housing unit 100 is generally a rectangular prism, the shape of the housing extension 300 preferably is also generally a rectangular prism. In this way, when the housing extension 300 is joined to the main housing unit 100, the two appear to form one continuous body. In a specific preferred embodiment, the housing extension 300 is substantially a rectangular prism with its front corners rounded or chamfered, the main housing unit 100 having a width of about 2.25 inches and a depth of about 2 inches. The housing extension 300 may have any suitable length, which in some cases is approximately 8 inches but may also be longer or shorter.

Figure 9:
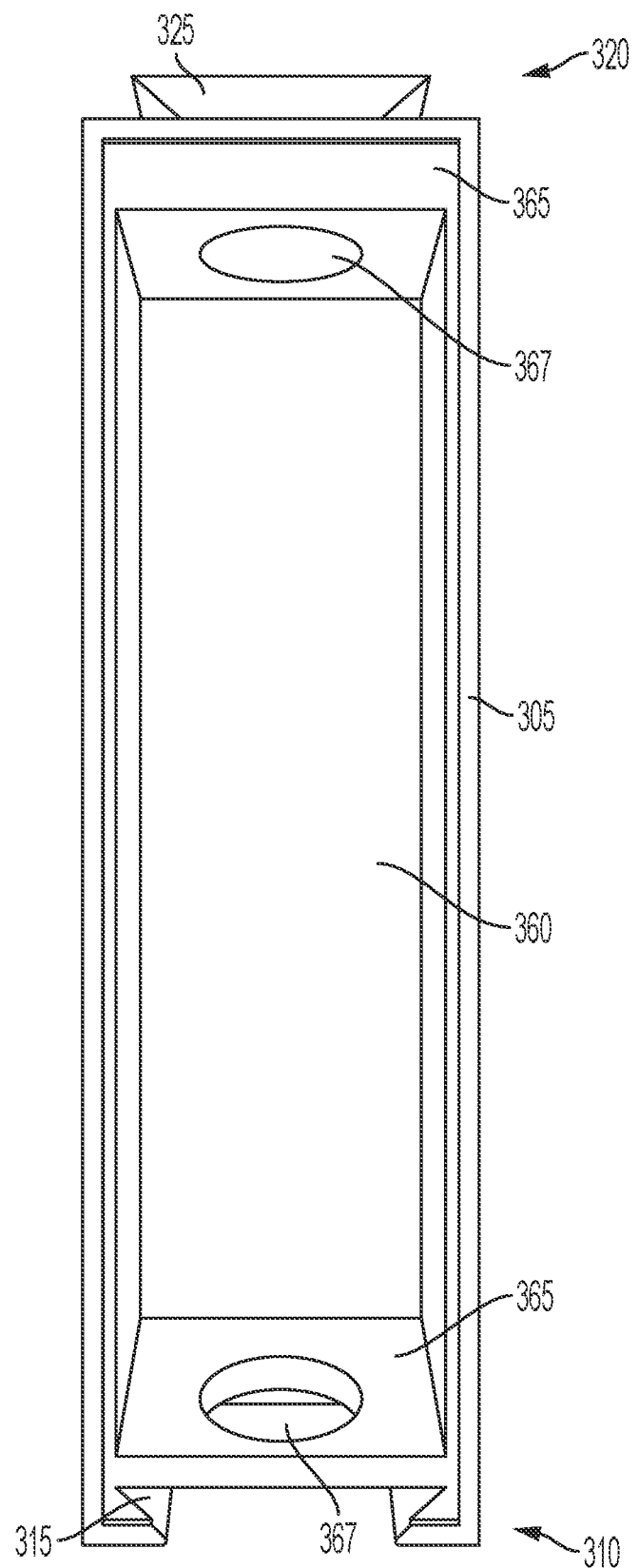
FIG. 9: A rear view of one embodiment of a housing extension of a modular housing kit.
Figure 10:
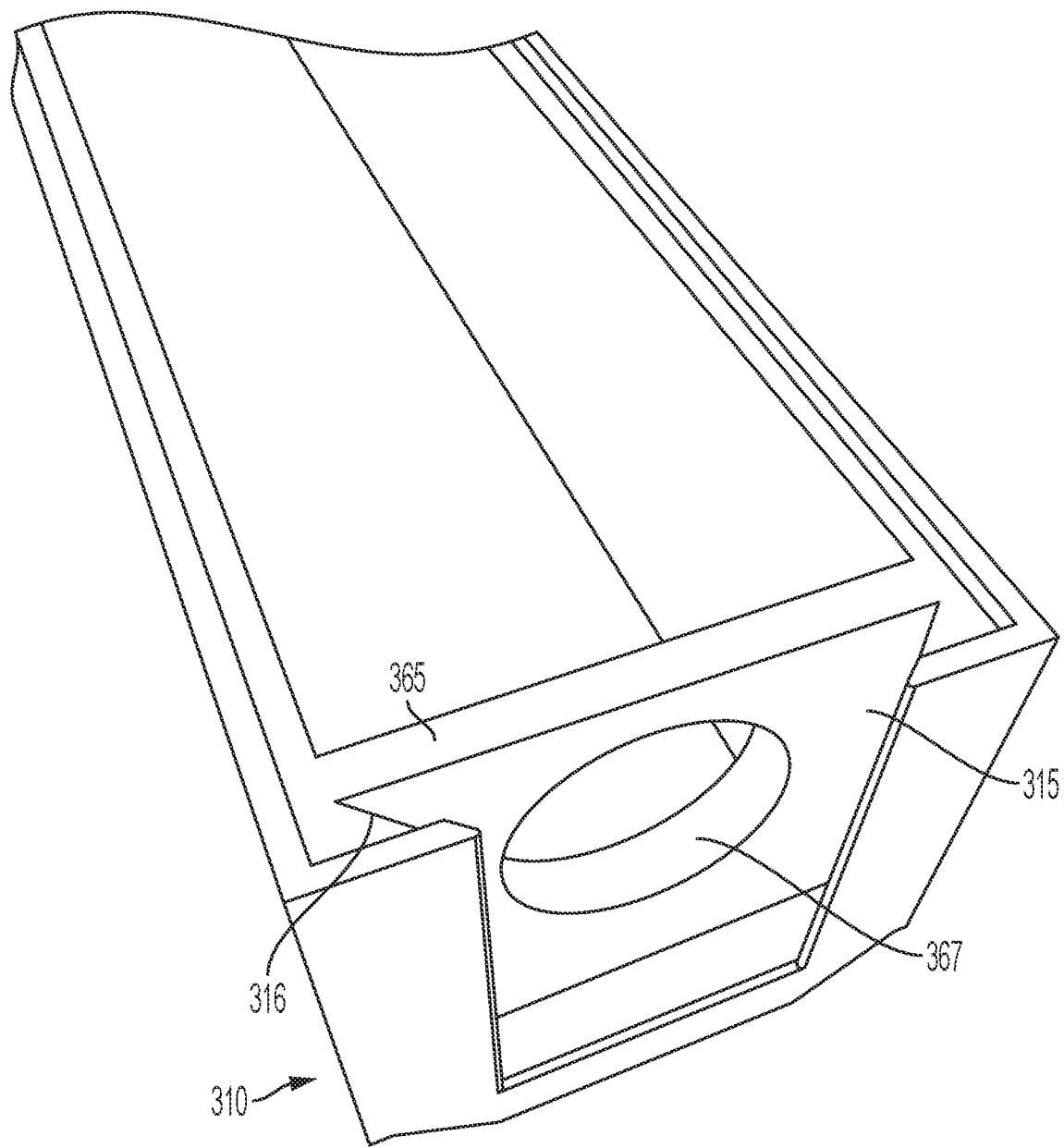
FIG. 10: A detailed perspective view of the female end of an embodiment of a housing extension of a modular housing kit.
Figure 11:
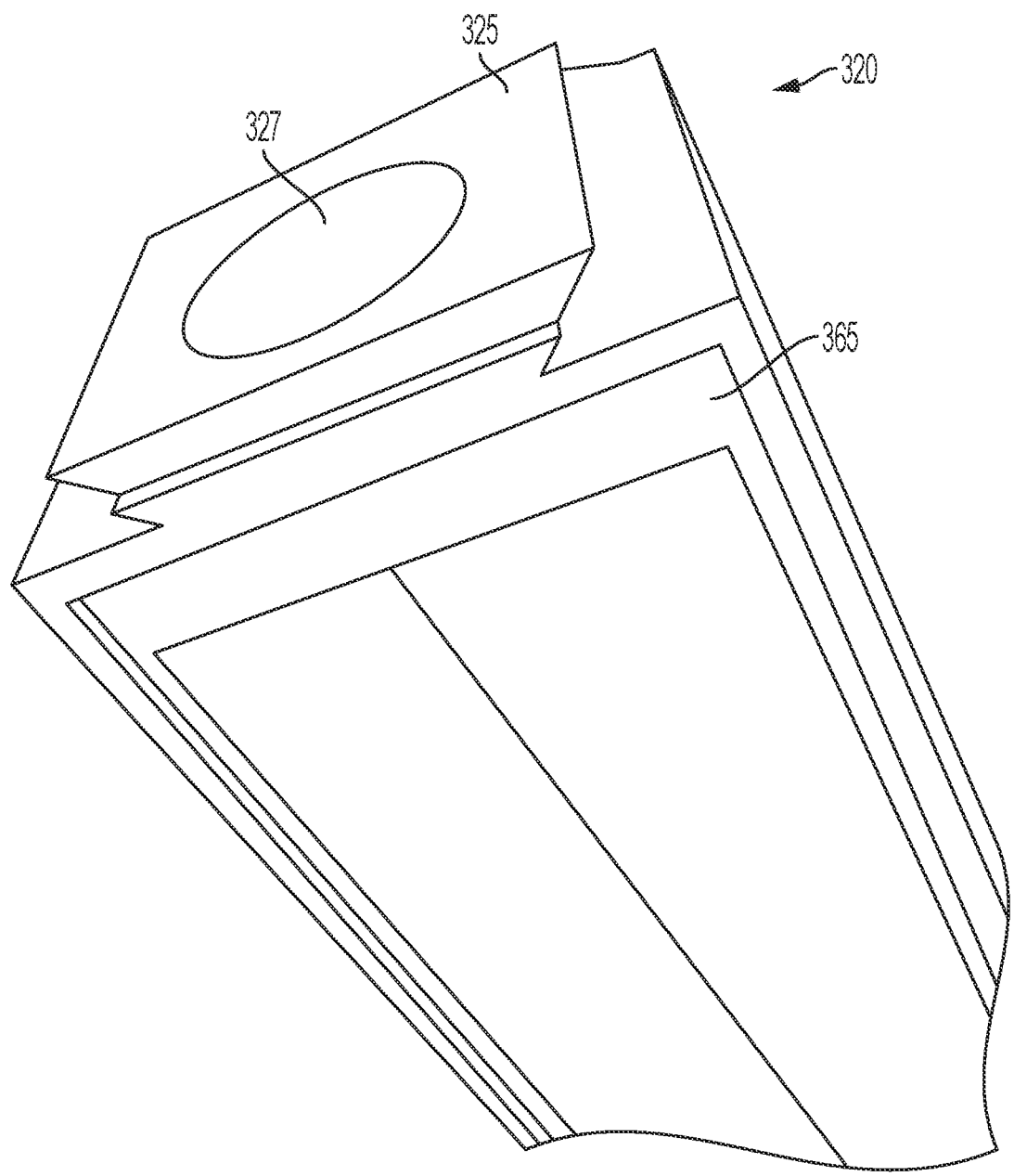
FIG. 11: A detailed perspective view of the male end of the same embodiment of a housing extension of a modular housing kit.
Figure 12:
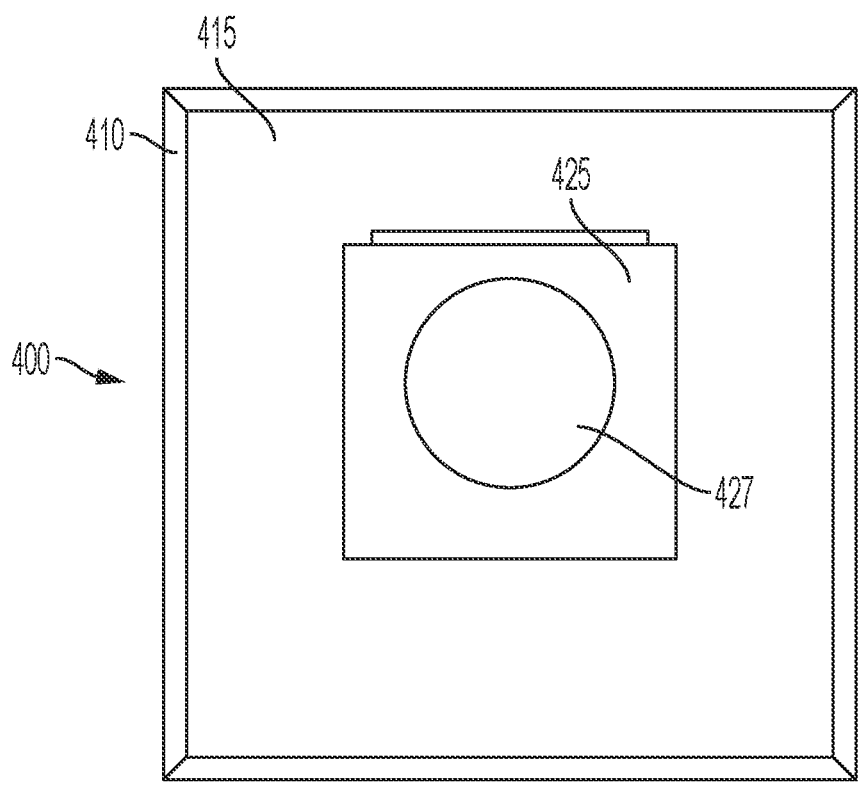
FIG. 12: A top view of one embodiment of a base stand of a modular housing kit.
Figure 13:
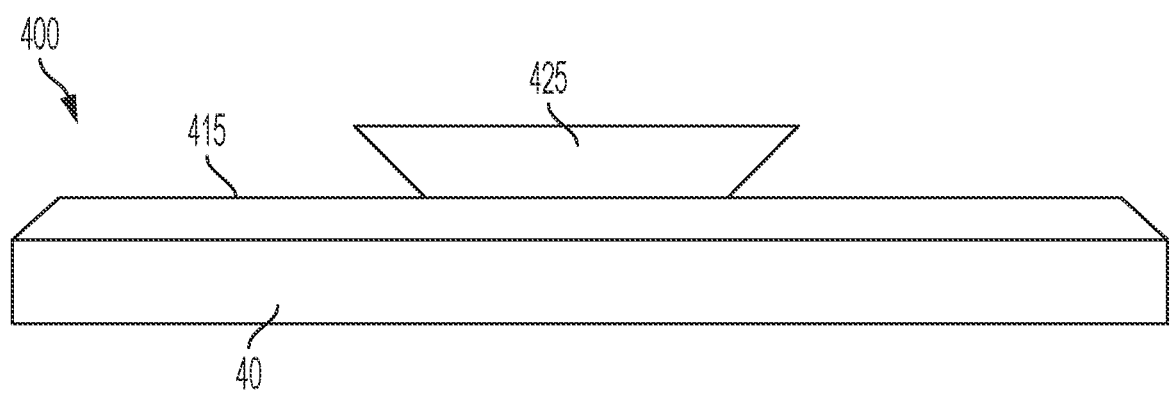
FIG. 13: A front view of one embodiment of a base stand of a modular housing kit.

The removable backplate 350 exposes the interior of the housing extension 300. In a preferred embodiment, the interior of the housing extension 300 is substantially hollow, which allows the housing extension 300 to house and conceal the cords associated with a security camera in the main housing unit 100. As shown in FIG. 9, the substantially hollow interior 360 may include one or more cross supports 365 to provide structural support to the ends and walls of the housing extension 300. If the cross supports 365 extend across the substantially hollow interior 365, they preferably include through holes 367 to allow the cords to pass through the cross supports 365 to either end 310, 320 of the housing extension 300. Alternatively, in other embodiments, the interior of the housing extension 300 may be substantially solid but, preferably, include one or more channels for running the cords of the security camera.

Preferably, one end of the housing extension 300 is a female end 310 and the other end is a complementary male end 320. This configuration allows the appropriate end of the housing extension 300 (e.g. the male end 320) to secure to one end of the main housing unit 100 (e.g. the female end 110) so that the other end of the housing extension 300 (e.g. the female end 310) can connect to any of the remaining components of the modular housing kit that are configured to connect to the now-attached end of the main housing unit 100 (e.g. the female end 110). In some embodiments, however, the two ends 310, 320, may both be male ends or may both be female ends.

The female end 310 may comprise any suitable structure, such as any of the variations discussed above with respect to the main housing unit 100. Preferably, the female end 310 comprises a recessed slot 315 that is substantially the same as one, or more preferably both, of the recessed slots 115 of the female ends of the main housing unit 100. Thus, any protrusion of a component in the modular housing kit can be interchangeably connected to a female end 110 of the main housing unit 100 or the female end 310 of the housing extension 300. Similar to the removable backplate 150 of the main housing unit 100, the removable backplate 350 of the housing extension 300 preferably covers at least part of the rear opening 316 of the recessed slot 315.

At the male end 320, a protrusion 325 extends from the end of the housing extension 300. The shape of the protrusion 325 is generally defined with reference to the shape of a vertical cross section of the protrusion. The protrusion 325 may have a vertical cross section of any suitable shape, but preferably, the shape of the cross section of the protrusion 325 is complementary to the shape of the vertical cross section of the recessed slot 115 of the main housing unit 110. In a preferred embodiment, the outer portion of the cross section (or a portion of the cross section that is farther from the housing extension 300) has a width that is greater than the width of a closer portion of the cross section. Even more preferably, the width of the cross section in some embodiments may continually increase as the protrusion 325 extends outward from the end 320 of the housing extension 300. But in other embodiments, portions of the cross section may have a constant width, or some closer portions of the cross section may decrease in width rather than increase.

FIGS. 18A-E depicts various shapes that may be suitable cross sections for the recessed slots that receive a complementary protrusion 325. In a specific preferred embodiment, the vertical cross section of the protrusion matches the vertical cross section of the recessed slot and specifically is a trapezoidal shape having an outermost edge with a length of about 1.75 inches, an innermost edge with a length of about 1.25 inches, and a height of about 0.25 inches.

Preferably, a through hole 327 extends through the protrusion 325 of the male end 320. The through hole 327 allows the cords associated with a security camera to pass into or out of the housing extension 300. In the alternative, the protrusion 325 may have a recess or channel, which may be preferably located on the back side of the protrusion and may be concealed by a removable backplate, to allow the cords to pass through the end 320 of the housing extension 300.

Some embodiments of the modular housing kit include two or more housing extensions 300. In one preferred embodiment, the modular housing kit includes two housing extensions 300 of about the same length. Preferably, the two housing extensions 300 may be identical. In another preferred embodiment, the modular housing kit includes a first housing extension and a second housing extension of different lengths.

Optionally, the modular housing kit may also include a compact housing unit. Preferably, the compact housing unit is shorter in length than the main housing unit 100 but otherwise has a similar structure to the main housing unit 100. In a preferred embodiment, the compact housing unit comprises a compact body having a front face, an internal camera compartment, and a first end opposite of a second end; and a removable backplate. The internal camera compartment may have any of the structures discussed above with respect to the internal camera compartment 140 of the main housing unit 100. Preferably, the two ends of the compact housing unit are substantially the same as the two ends of the main housing unit 100. For instance, if the main housing unit 100 comprises two mirror image female ends 110, 120, the compact housing unit preferably comprises two substantially identical mirror image female ends. In this way, the compact housing unit is readily interchangeable with the main housing unit 100. Alternatively, in some embodiments, one end of the compact housing unit may be a closed end (i.e. an end that is neither female nor male).

Advantageously, the design of the various components in embodiments of the modular housing kit allows a single kit to easily accommodate multiple different configurations for installation of a camera. Because of the design of the complementary protrusions and recessed slots, different components can be easily connected together by sliding a protrusion into the slot. The protrusions preferably fit snugly into the recessed slots, thus providing a secure connection between the two components. And preferably, except for any tools that may be required to secure the removable backplate, no other tools may be required to connect the different components.

FIGS. 14-17 illustrate multiple exemplary configurations that may be achieved. For this example, a single modular housing kit comprises a main housing unit 100, a base stand 400, a first end cover 200, a second end cover, a first housing extension 300, and a second housing extension.

Figure 14:
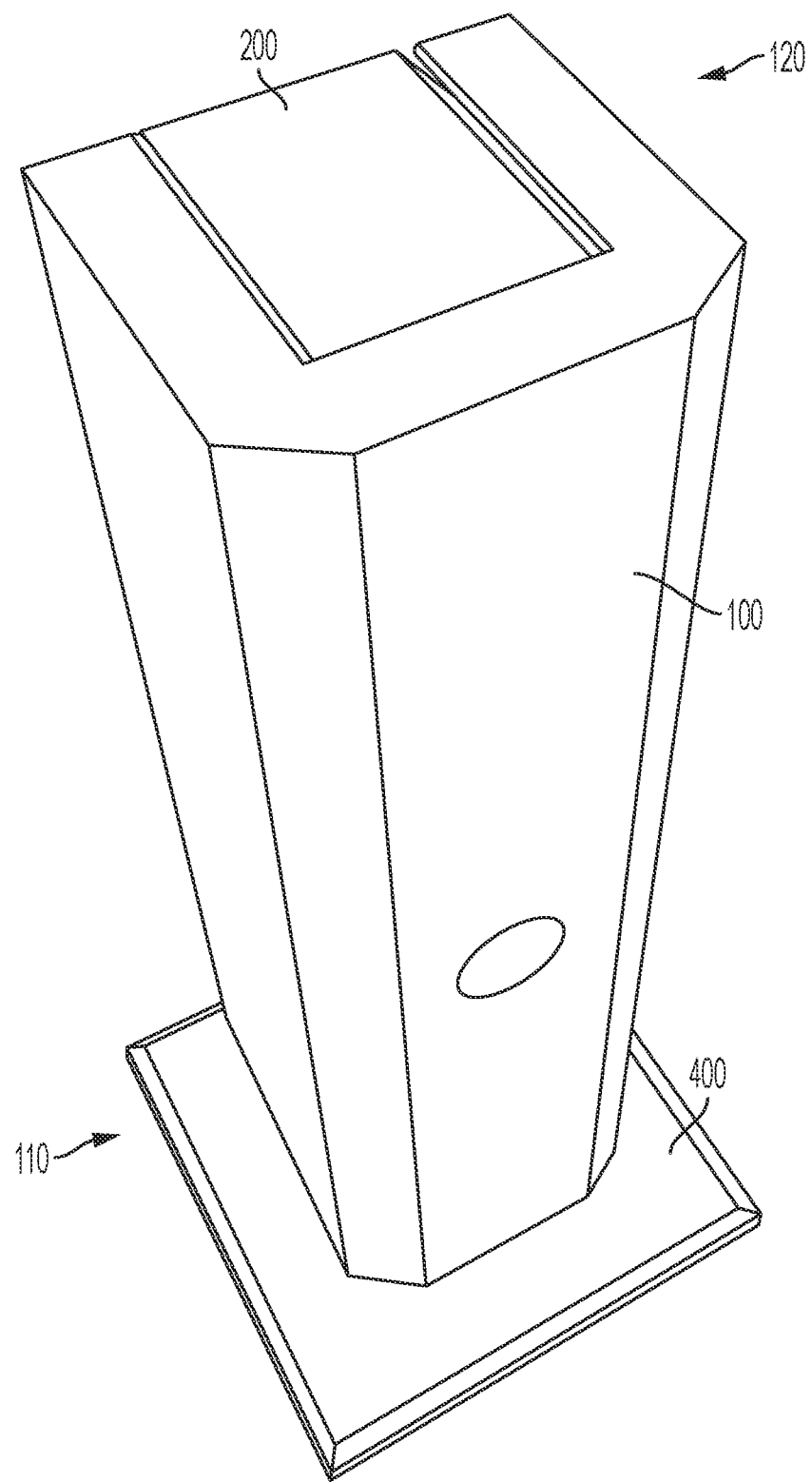
FIG. 14: A perspective view of one configuration of an assembled modular housing kit comprising a main housing unit connected to an end cover and a base stand.

For instance, as shown in FIG. 14, one configuration comprises a main housing unit 100, a base stand 400 connected to one end 110 of the main housing unit 100, and a first end cover 200 connected at the other end 120 of the main housing unit 100. This exemplary configuration may be suitable for installing a security camera located on a desk or shelf.

Figure 15:
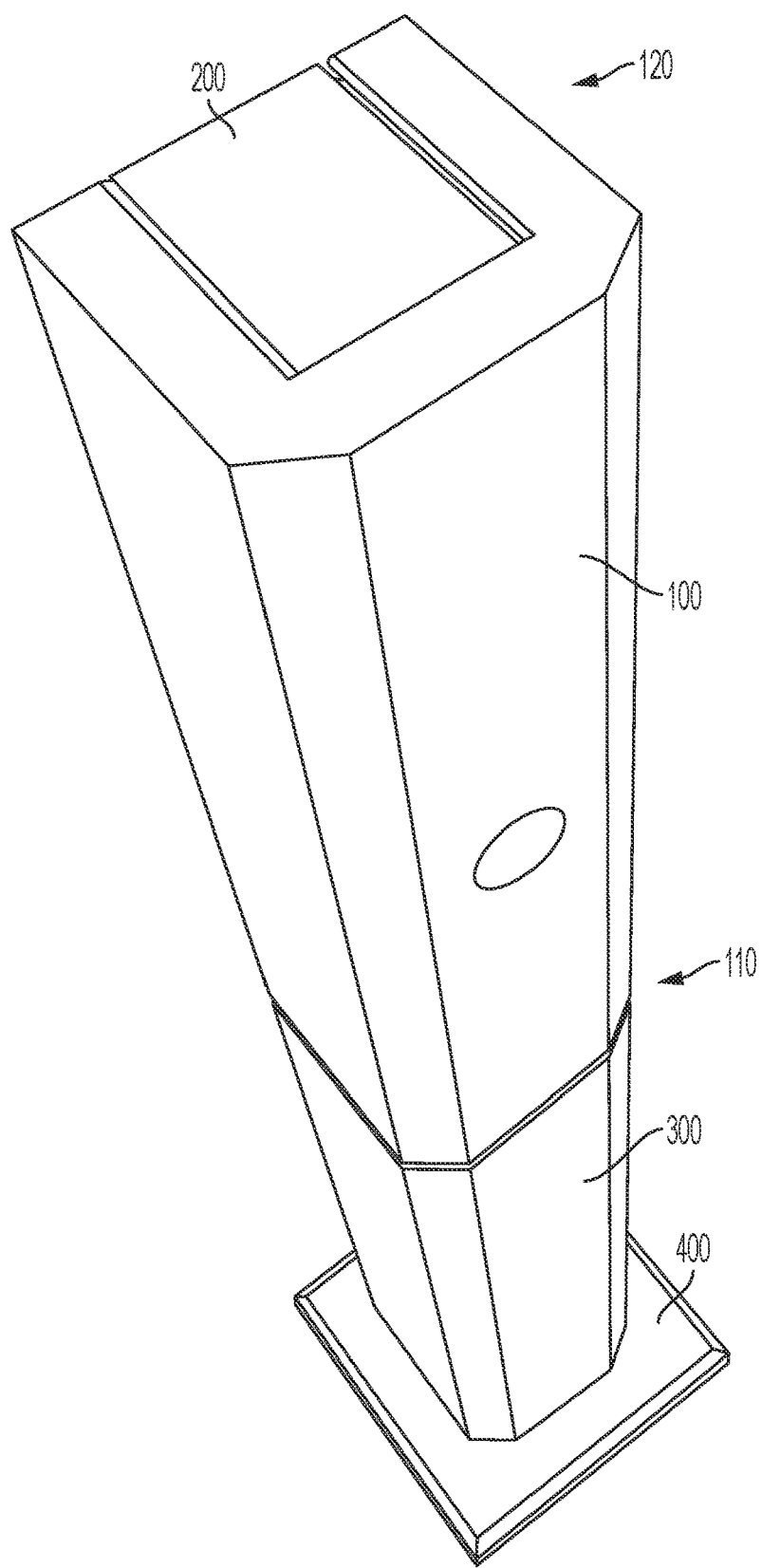
FIG. 15: A perspective view of another configuration of an assembled modular housing kit comprising a main housing unit connected to an end cover and a first housing extension, the first housing extension connected to a second housing extension, and the second housing extension connected to a base stand.

As another example, shown in FIG. 15, a configuration may comprise a main housing unit 100, a first housing extension 300 connected to one end 110 of the main housing unit 100, a base stand 400 connected to the other end of the first housing extension 300, and a first end cover 200 connected to the other end 120 of the main housing unit 100. In this configuration, the modular housing kit may be used as a stand located on the ground that houses a security camera.

Figure 16:
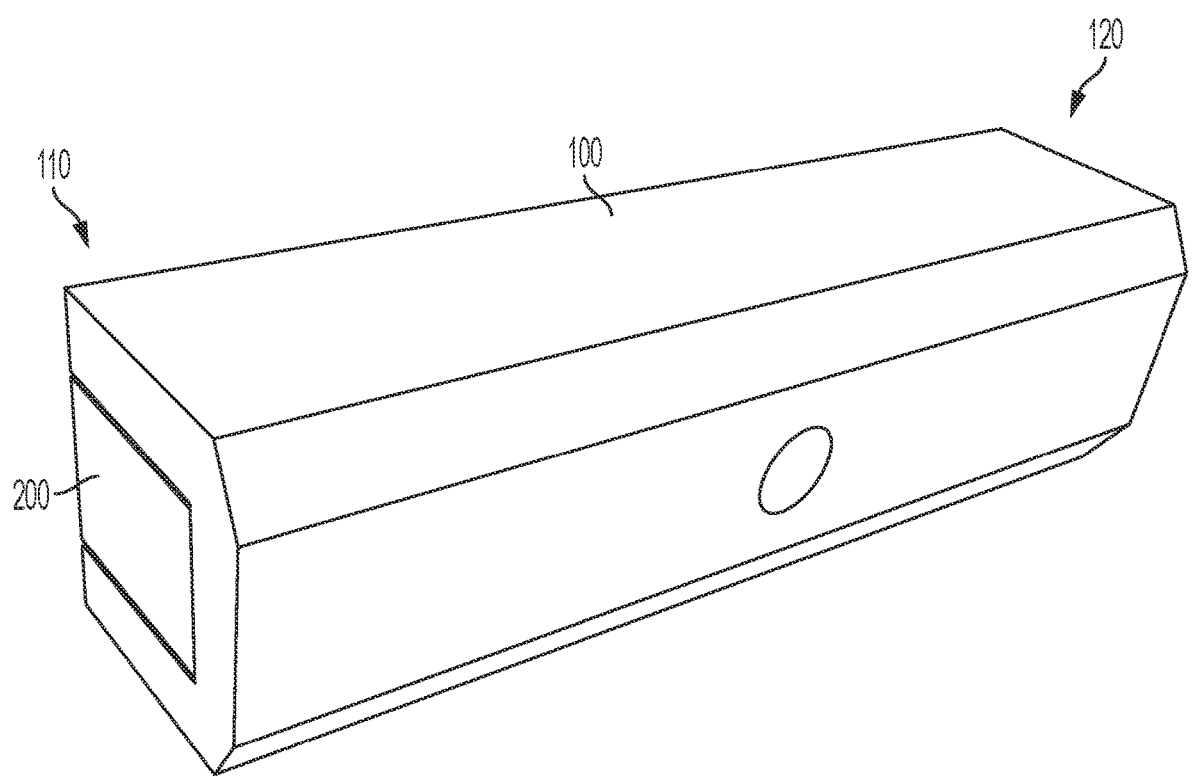
FIG. 16: A perspective view of another configuration of an assembled modular housing kit comprising a main housing unit connected to a first end cover and a second end cover.

In yet another example, shown in FIG. 16, a configuration may comprise a main housing unit 100, a first end cover 200 connected at one end 110 of the main housing unit 100, and a second end cover (not visible) connected at the other end 120 of the main housing unit 100. This configuration may be suitable for a low-profile installation on a desk or shelf. Alternatively, this configuration may be used to install a security camera on a wall or ceiling. In some embodiments, the modular housing kit may include one or more mounting brackets to attach the components to a wall or ceiling, or the removable backplate 150 or another component may include integrated brackets for installing the housing on a wall or ceiling.

Figure 17:
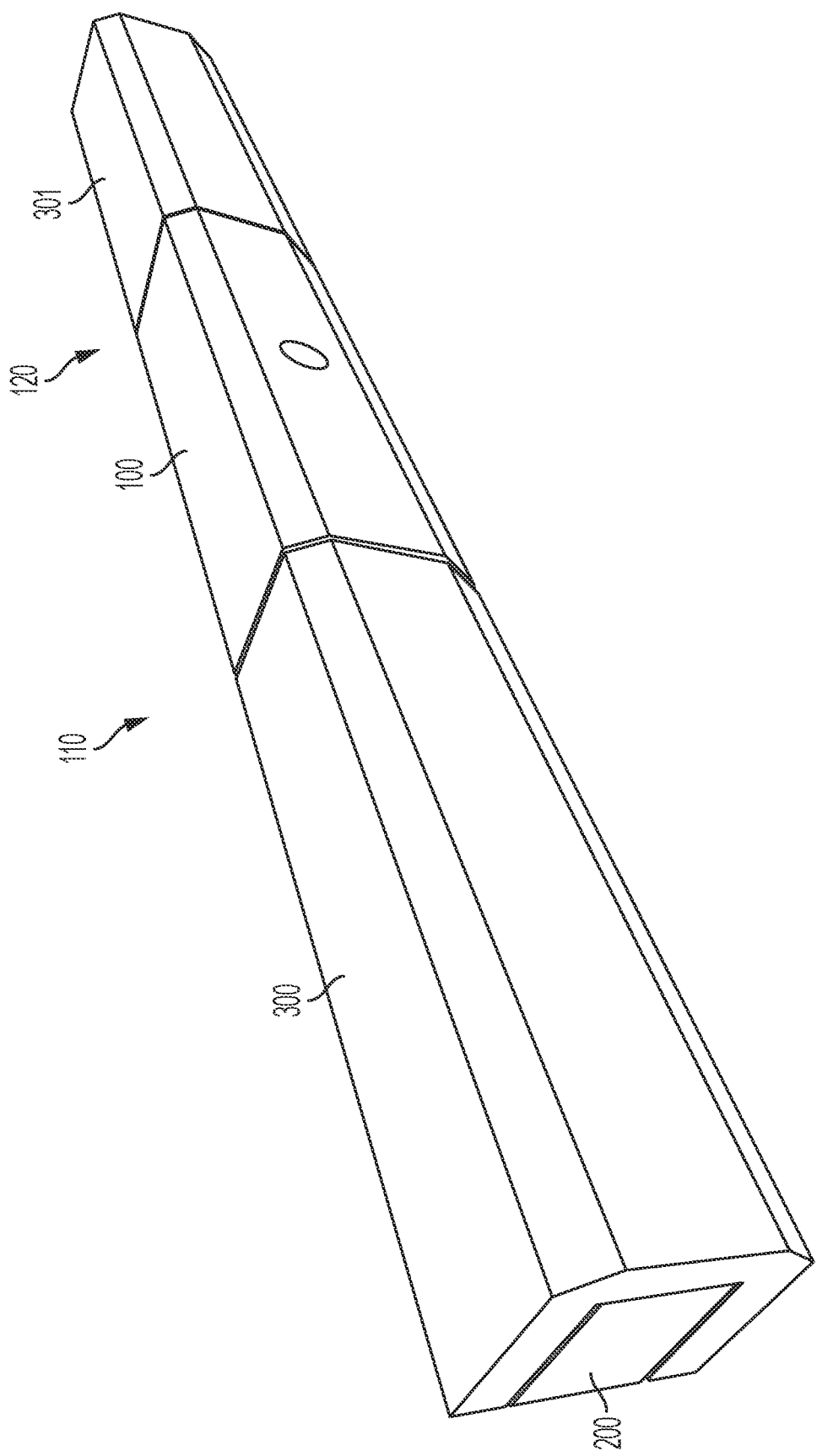
FIG. 17: A perspective view of another configuration of an assembled modular housing kit comprising a main housing unit connected at each end to a first and second housing extension, each housing extension connected to a first or second end cover.
Figure 18A:
FIG. 18A-E: Rear views of various recessed slots showing exemplary shapes that may be suitable as the shape of the vertical cross section of a recessed slot.
Figure 18B:
Figure 18C:
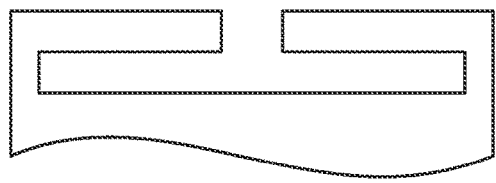
Figure 18D:
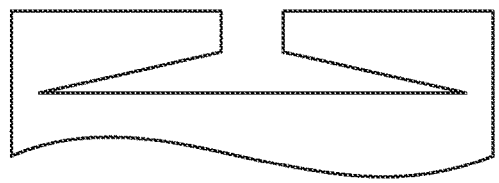
Figure 18E:
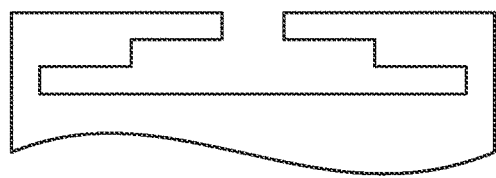

Another example of an exemplary configuration is shown in FIG. 17. The configuration comprises a main housing unit 100, a first housing extension 300 connected to one end 110 of the main housing unit 100, a second housing extension 301 connected to the other end 120 of the main housing unit 100, a first end cover 200 connected at the other end of the first housing extension 300, and a second end cover (not visible) connected at the other end 320 of the second housing extension 301.

In addition to the foregoing examples, numerous other configurations are possible with this exemplary embodiment of the modular housing kit. Of course, other embodiments of a modular housing kit may include only a subset of those components or additional components, depending on the desired number of possible configurations for that kit.

While the invention has been described with respect to a limited number of embodiments, those skilled in the art, having benefit of this disclosure, will appreciate that other embodiments can be devised which do not depart from the scope of the invention as disclosed here.

I claim:

1. A kit for constructing a camera housing comprising:
   a main housing unit having a first end, a second end, and a front face, wherein said main housing unit contains a camera compartment having an opening to said front face, and wherein said main housing unit at each end is at least partially open to a recessed slot that has a width at an outer portion of the slot that is less than the width of an interior portion of the slot;
   a first end cover comprising a locking piece having a shape that is complementary to the shape of said recessed slot at said first end; and
   a base stand comprising a base having a top surface and a protrusion extending from said top surface, wherein said protrusion has a shape that is complementary to the shape of said recessed slot at said second end.

2. The kit of claim 1, wherein said main housing unit comprises a removable back plate that at least partially covers said recessed slot of said first end and at least partially covers said recessed slot of said second end.

3. The kit of claim 1, wherein said locking piece of said first end cover has a vertical cross sectional shape that is complementary to the shape of the vertical cross section of said recessed slot at said first end; and wherein said protrusion of said base stand has a vertical cross sectional shape that is complementary to the shape of the vertical cross section of said recessed slot at said second end.

4. The kit of claim 3 further comprising a second end cover comprising a locking piece having a vertical cross sectional shape that is complementary to the shape of the vertical cross section of said recessed slot at said second end.

5. The kit of claim 3, wherein the shape of the vertical cross section of said recessed slot at said first end is approximately the same as the shape of the vertical cross section of said recessed slot at said second end.

6. The kit of claim 1, wherein the width of said recessed slot at said first end continuously increases from the outermost portion to the innermost portion of the slot.

7. The kit of claim 1, wherein said main housing unit is substantially hollow.

8. The kit of claim 1, wherein a through hole extends through said protrusion and said base.

9. The kit of claim 1, further comprising a first housing extension having a male end and a female end, wherein at said female end said first housing extension is at least partially open to a recessed slot that has a width at an outer portion of the slot that is less than the width of an interior portion of the slot, and wherein at said male end said first housing extension comprises a protrusion that has a shape that is complementary to the shape of said recessed slot at said first or second end of said main housing unit.

10. The kit of claim 9, wherein a through hole extends through said protrusion of said first housing extension.

11. The kit of claim 9, wherein said protrusion of said first housing unit has a vertical cross sectional shape that is complementary to the shape of the vertical cross section of said recessed slot at said first or second end of said main housing unit.

12. The kit of claim 11, further comprising a second housing extension having a male end and a female end, wherein at said female end said first housing extension is at least partially open to a recessed slot that has a width at an outer portion of the slot that is less than the width of an interior portion of the slot, and wherein at said male end said second housing extension comprises a protrusion that has a vertical cross sectional shape that is complementary to the shape of the vertical cross section of said recessed slot at said first or second end of said main housing unit.

13. The kit of claim 1, further comprising a compact housing unit having a first end, a second end, and a front face, wherein said compact housing unit contains a camera compartment having an opening to said front face, wherein said compact housing unit at each end is at least partially open to a recessed slot that has a width at its exterior opening that is less than the width of an interior portion of the slot, and wherein the length of said compact housing unit is less than the length of said main housing said.

14. The kit of claim 1, further comprising a second end cover comprising a locking piece having a vertical cross sectional shape that is complementary to the shape of the vertical cross section of said recessed slot at said second end.

15. A kit for constructing a camera housing comprising:
   a main housing unit having a first end, a second end, and a front face, wherein said main housing unit contains a camera compartment having an opening to said front face, wherein said main housing unit at each end is at least partially open to a recessed slot that has a width at an outer portion of the slot that is less than the width of an interior portion of the slot, and wherein the shape of the vertical cross section of said recessed slot at said first end is substantially the same as the shape of the vertical cross section of said recessed slot at said second end;
- a first end cover comprising a locking piece having a vertical cross sectional shape that is complementary to the shape of the vertical cross section of said recessed slots;
- a second end cover comprising a locking piece having a vertical cross sectional shape that is complementary to the shape of the vertical cross section of said recessed slots;
- a first housing extension having a male end and a female end, wherein at said female end said first housing extension is at least partially open to a recessed slot that has a width at an outer portion of the slot that is less than the width of an interior portion of the slot and that has a vertical cross section with a shape that is substantially the same as the shape of the vertical cross section of the recessed slots of the main housing unit, and wherein at said male end said first housing extension comprises a protrusion that has a vertical cross sectional shape that is complementary to the shape of the vertical cross section of said recessed slots of said main housing unit; and
- a base stand comprising a base having a top surface and a protrusion extending from said top surface, wherein said protrusion has a vertical cross sectional shape that is complementary to the shape of the vertical cross section of said recessed slots.

16. The kit of claim 15, further comprising a second housing extension having a male end and a female end, wherein at said female end said first housing extension is at least partially open to a recessed slot that has a width at an outer portion of the slot that is less than the width of an interior portion of the slot, and wherein at said male end said first housing extension comprises a protrusion that has a vertical cross sectional shape that is complementary to the shape of the vertical cross section of said recessed slots.

17. The kit of claim 16, wherein said first housing extension and said second housing extension are the same length.

18. The kit of claim 16, wherein a first through hole extends through said protrusion of said base stand, a second through hole extends through said protrusion of said first housing extension, and a third through hole extends through said protrusion of said second housing extension.

19. The kit of claim 15, wherein the width of each of said recessed slots continuously increases from the outermost portion to the innermost portion of the slot.

20. The kit of claim 15, wherein said main housing unit comprises a removable back plate that at least partially covers said recessed slot of said first end and at least partially covers said recessed slot of said second end, and wherein said first housing extension comprises a removable back plate that at least partially covers said recess slot of said female end.

21. A modular housing unit for a camera comprising:
- a main housing comprising:
  - a front face;
  - an internal camera compartment having an opening to said front face; and
  - a first end opposite of a second end, wherein said main housing at each end is at least partially open to a recessed slot that has a width at its exterior opening that is less than the width of an interior portion of the slot, and wherein the shape of the vertical cross section of said recessed slot at said first end is approximately the same as the shape of the vertical cross section of said recessed slot at said second end; and
- a removable back plate that at least partially covers said recessed slot of said first end and at least partially covers said recessed slot of said second end.

22. The housing unit of claim 21, wherein the width of said recessed slot at said first end continuously increases from the outermost portion to the innermost portion of the slot.

* * * * *